(12) United States Patent
Kim et al.

(10) Patent No.: US 8,737,016 B1
(45) Date of Patent: May 27, 2014

(54) MOTOR AND HARD DISK DRIVE INCLUDING THE SAME

(71) Applicant: Samsung Electro-Mechanics Co., Ltd., Suwon (KR)

(72) Inventors: Ju Ho Kim, Suwon (KR); Hyo Seok Lee, Suwon (KR); Yong Il Kwon, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/742,836

(22) Filed: Jan. 16, 2013

(51) Int. Cl.
*G11B 17/02* (2006.01)
(52) U.S. Cl.
USPC .................................................. 360/99.08
(58) Field of Classification Search
USPC .................................................. 360/99.08
See application file for complete search history.

(56) References Cited

U.S. PATENT DOCUMENTS

| | | | |
|---|---|---|---|
| 8,472,132 B2* | 6/2013 | Yamada et al. ............ | 360/99.08 |
| 2006/0147134 A1 | 7/2006 | Jang et al. | |
| 2008/0075398 A1 | 3/2008 | Kimura et al. | |
| 2008/0158729 A1 | 7/2008 | Tamaoka | |
| 2010/0296190 A1 | 11/2010 | Yamada et al. | |
| 2011/0026163 A1 | 2/2011 | Komori et al. | |

FOREIGN PATENT DOCUMENTS

| | | |
|---|---|---|
| JP | 2003-113837 | 4/2003 |
| JP | 2005-265180 | 9/2005 |
| JP | 2008/82414 | 4/2008 |
| JP | 2008-167521 | 7/2008 |
| JP | 2011-33075 | 2/2011 |
| KR | 10-2006-0079934 | 7/2006 |
| WO | 2009/145159 A1 | 12/2009 |

OTHER PUBLICATIONS

Office Action issued by the Japanese Patent Office on Oct. 1, 2013 in the corresponding Japanese patent application No. 2013-003737.
Office Action issued by the Korean Patent Office on Sep. 3, 2013 in the corresponding Korean patent application No. 10-2012-0092357.

* cited by examiner

*Primary Examiner* — Mark Blouin (57) ABSTRACT

There are provided a motor and a hard disk drive including the same. The motor includes: a sleeve supporting a shaft with a lubricating fluid; and a rotor fixed to the shaft, rotating together therewith, and having a surface facing the sleeve, wherein one surface of the surface of the rotor facing the sleeve and a surface of the sleeve facing the rotor is provided with a thrust dynamic pressure groove, and the other surface of the surface of the rotor facing the sleeve and the surface of the sleeve facing the rotor is provided with an extension groove extended to the outside of the thrust dynamic pressure groove so as to partially face the thrust dynamic pressure groove.

10 Claims, 6 Drawing Sheets

MOTOR AND HARD DISK DRIVE INCLUDING THE SAME

CROSS-REFERENCE TO RELATED APPLICATIONS

This application claims the priority of Korean Patent Application No. 10-2012-0092357 filed on Aug. 23, 2012, in the Korean Intellectual Property Office, the disclosure of which is incorporated herein by reference.

BACKGROUND OF THE INVENTION

1. Field of the Invention

The present invention relates to a motor and a hard disk drive including the same, and more particularly, to a motor capable of preventing low pressure from being generated in a thrust dynamic pressure part, and a hard disk drive including the same.

2. Description of the Related Art

A hard disk drive (HDD), an information storage device, reads data stored on a disk or writes data to a disk using a read/write head.

The hard disk drive requires a disk driving device capable of driving the disk. In the disk driving device, a small-sized spindle motor may be used.

The small spindle motor commonly uses a hydrodynamic bearing assembly. A lubricating fluid is interposed between a shaft and a sleeve of the hydrodynamic bearing assembly, such that the shaft is supported by fluid pressure generated in the lubricating fluid.

A thrust bearing may be formed between a rotor and the sleeve of the hydrodynamic bearing assembly to smoothly support rotation of the rotor.

Here, the lubricating fluid may flow smoothly by the thrust bearing inwardly in a radial direction.

Here, in the case in which a width of a clearance between the rotor and the sleeve is changed, low pressure may be generated in a location in which the clearance is a relatively narrow while the lubricating fluid passes through the clearance, such that air bubbles may be generated in the lubricating fluid as the low pressure is generated.

Since this is closely associated with the performance of the motor, research into a technology for suppressing the generation of low pressure has been urgently demanded.

In the related art described in the following Patent Document, since a clearance is narrow in a location in which a thrust dynamic pressure groove is formed, low pressure may still be generated.

RELATED ART DOCUMENT (Patent Document 1) Japanese Patent Laid-Open Publication No. 2008-167521

SUMMARY OF THE INVENTION

An aspect of the present invention provides a motor capable of preventing low pressure from being generated between a rotor and a sleeve to suppress the generation of air bubbles in a lubricating fluid, and a hard disk drive including the same According to an aspect of the present invention, there is provided a motor including: a sleeve supporting a shaft with a lubricating fluid; and a rotor fixed to the shaft, rotating together therewith, and having a surface facing the sleeve, wherein one surface of the surface of the rotor facing the sleeve and a surface of the sleeve facing the rotor is provided with a thrust dynamic pressure groove, and the other surface of the surface of the rotor facing the sleeve and the surface of the sleeve facing the rotor is provided with an extension groove extended to the outside of the thrust dynamic pressure groove so as to partially face the thrust dynamic pressure groove.

The thrust dynamic pressure groove may be formed in the sleeve and the extension groove is formed in the rotor.

The motor may satisfy the following Conditional Equation 1:

$$Rh < Rg < Rb \qquad \text{Conditional Equation 1}$$

where, Rh indicates a distance from a center of the shaft to an inner edge of the extension groove, Rg indicates a distance from the center of the shaft to an outer edge of the thrust dynamic pressure groove, and Rb indicates a distance from the center of the shaft to an outer peripheral surface of the sleeve.

The motor the following Conditional Equation 2:

$$F = (D^2 + E^2)^{0.5} \qquad \text{Conditional Equation 2}$$

where, D indicates a length of a portion of the extension groove facing the thrust dynamic pressure groove, E indicates a distance of a clearance between the rotor at an inner portion of the extension groove in a radial direction and the sleeve, and F indicates the shortest distance among distances between an inner edge of the extension groove and an outer edge of the thrust dynamic pressure groove.

The motor may satisfy the following Conditional Equation 3:

$$0.5 < F/C < 12 \qquad \text{Conditional Equation 3}$$

where, F indicates the shortest distance among distances between an inner edge of the extension groove and an outer edge of the thrust dynamic pressure groove, and C indicates a sum of a distance of a clearance between the rotor at an inner portion of the extension groove in a radial direction and the sleeve and a depth of the thrust dynamic pressure groove.

A clearance between the rotor and the sleeve may be widest in a location in which the extension groove and the thrust dynamic pressure groove face each other.

The thrust dynamic pressure groove may be formed in a portion of an upper surface of the sleeve.

The thrust dynamic pressure groove may have any one of a spiral shape, a herringbone shape, and a helical shape.

The motor may further include a stator coupled to the sleeve and including a core having a coil wound therearound in order to generate rotational driving force.

According to another embodiment of the present invention, there is provided a hard disk drive including: a motor as described above rotating a disk by power applied through a substrate; a magnetic head writing data to the disk and reading data from the disk; and a head driving part transferring the magnetic head to a predetermined position on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 1:
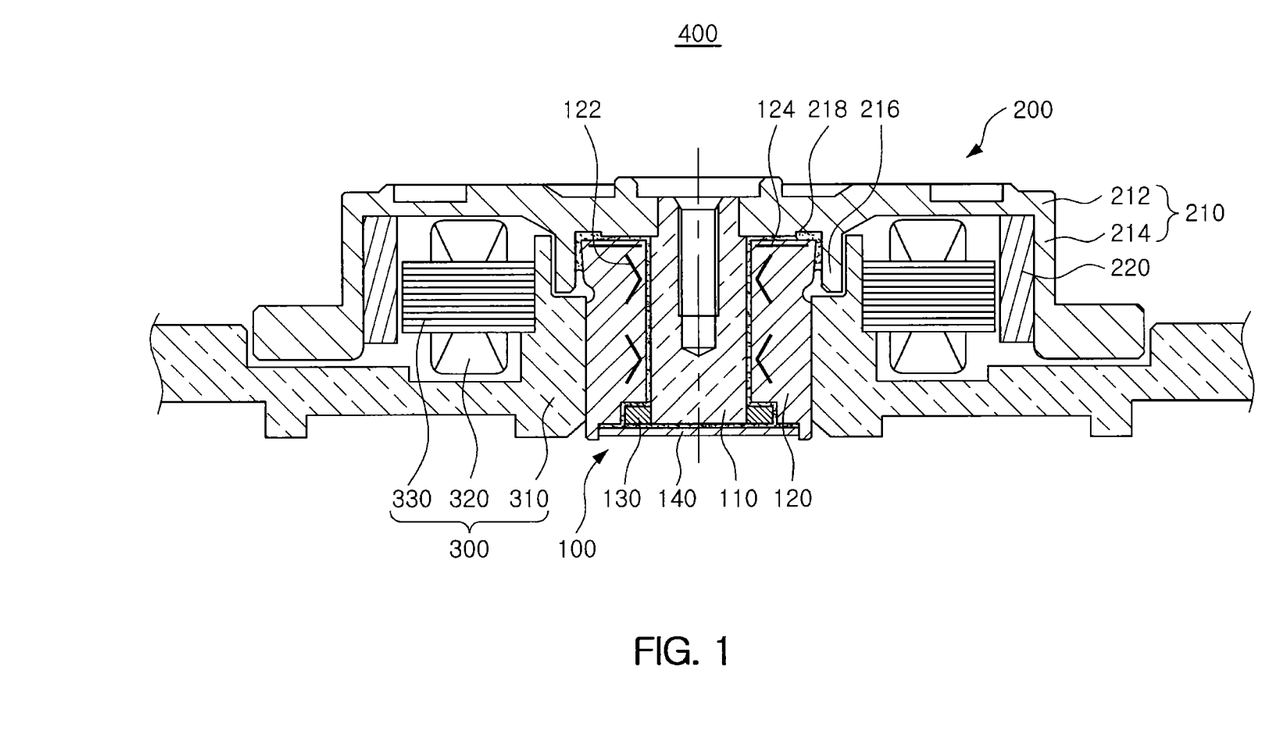
FIG. 1 is a schematic cross-sectional view showing a motor according to an embodiment of the present invention.

FIG. 1 is a schematic cross-sectional view showing a motor according to an embodiment of the present invention.

Referring to FIG. 1, a motor 400 according to the embodiment of the present invention may include a hydrodynamic bearing assembly 100, a rotor 200, and a stator 300.

Terms with respect to directions will first be defined. As viewed in FIG. 1, an axial direction refers to a vertical direction based on a shaft 110, and an outer radial or inner radial direction refers to a direction towards an outer edge of the rotor 200 based on the shaft 110 or a direction towards the center of the shaft 110 based on the outer edge of the rotor 200.

The hydrodynamic bearing assembly 100 may include the shaft 110, a sleeve 120, a thrust plate 130, and a cover plate 140.

The sleeve 120 may support the shaft 110 such that an upper end of the shaft 110 protrudes upwardly in the axial direction, and may be formed by forging Cu or Al or sintering Cu—Fe based alloy powders or SUS based powders.

Therefore, the sleeve 120 may be a type of sintered sleeve and have a lubricating fluid impregnated therein to significantly increase a content of the lubricating fluid provided to the hydrodynamic bearing assembly 100.

In this configuration, the shaft 110 may be inserted into a shaft hole of the sleeve 120 so as to have a micro clearance therewith. The micro clearance is filled with the lubricating fluid, and the rotation of the shaft 110 may be more smoothly supported by a radial dynamic pressure groove 122 formed in at least one of an outer surface of the shaft 110 and an inner surface of the sleeve 120.

The radial dynamic pressure groove 122 may be formed in an inner peripheral surface of the sleeve 120, which is inside of the shaft hole of the sleeve 120, and generate pressure so that the shaft 110 may smoothly rotate in a state in which the shaft 110 is separated from the sleeve 120 by a predetermined interval at the time of rotation of the shaft 110.

However, the radial dynamic pressure groove 122 is not limited to being formed in the inner peripheral surface of the sleeve 120 as described above but may also be formed in the outer peripheral surface of the shaft 110. In addition, the number of radial dynamic pressure grooves is not limited.

Here, the radial dynamic pressure groove 122 may have any one of a herringbone shape, a spiral shape, and a helical shape. However, the radial dynamic pressure groove 122 may have any shape as long as radial dynamic pressure may be generated thereby.

In addition, at least one of an upper surface of the sleeve 120 and one surface of the rotor 200 facing the upper surface of the sleeve 120 may be provided with a thrust dynamic pressure groove 124, and the rotor 200 may rotate together with the shaft 110 in a state in which a predetermined amount of floating force is secured by the thrust dynamic pressure groove 124.

Here, the thrust dynamic pressure groove 124 may have a herringbone shape, a spiral shape, or a helical shape, similar to the radial dynamic pressure groove 122, but is not necessarily limited thereto. That is, the thrust dynamic pressure groove 124 may have any shape as long as thrust dynamic pressure may be provided thereby.

A detailed description of the thrust dynamic pressure groove 124 will be described below with reference to FIGS. 2 through 9.

Meanwhile, the shaft 110 may include the thrust plate 130 provided on a lower portion thereof in order to prevent the shaft 110 from being excessively floated at the time of rotation thereof.

The thrust plate 130 may include a hole corresponding to a cross section of the shaft 110 at the center thereof, and the shaft 110 may be inserted into the hole.

Here, the thrust plate 130 may be disposed in a lower portion of the sleeve 120 in the axial direction and be received in a step formed in the inner peripheral surface of the sleeve 120 toward the outer radial direction.

The thrust plate 130 may be separately manufactured and then coupled to the shaft 110. However, the thrust plate 130 may be formed integrally with the shaft 110 at the time of the manufacturing thereof and rotate together with the shaft 110 at the time of the rotation thereof.

When a rotating member including the shaft 110 is excessively floated, an outer portion of the thrust plate 130 contacts a bottom surface of the sleeve 120, whereby the excessive floating of the rotating member may be prevented.

Here, the lower portions of the sleeve 120 and the shaft 110 may be coupled to the cover plate 140 coupled to the sleeve 120 in a state in which a clearance with the shaft 110 is maintained.

The cover plate 140 may receive the lubricating fluid in the clearance between the cover plate 140 and the shaft 110 to serve as a bearing supporting the lower surface of the shaft 110.

The stator 300 may include a coil 320, a core 330, and a base member 310.

The stator 300 may be a fixed structure including the core 330 having the coil 320 wound therearound, wherein the coil 320 generates electromagnetic force having a predetermined magnitude at the time of the application of power.

The core 330 may be fixedly disposed on an upper portion of the base member 310 on which a printed circuit board (not shown) having circuit patterns printed thereon is provided. A plurality of coil holes having a predetermined size may be formed to penetrate the base member so as to expose the coil 320 downwardly in an upper surface of the base member 310 corresponding to the core 330 having the coil 320 wound therearound, and the coil 320 may be electrically connected to the printed circuit board (not shown) in order to supply external power thereto.

The rotor 200 may be a rotating structure rotatably provided with respect to the stator 300 and may include a rotor case 210 having an annular ring-shaped magnet 220 on an inner peripheral surface thereof, and the annular ring-shaped magnet 220 may correspond to the core 300 having a predetermined interval therebetween.

Here, the rotor case 210 may include a hub base 212 press-fitted into the upper end of the shaft 110 to thereby be fixed thereto and a magnet support part 214 extended from the hub base 212 in the outer radial direction and bent downwardly in the axial direction to support the magnet 220.

In addition, as the magnet 220, a permanent magnet generating magnetic force having a predetermined magnitude by alternately magnetizing an N pole and an S pole thereof in a circumferential direction may be used.

Here, rotational driving of the rotor 200 will be schematically described. When power is supplied to the coil 320 wound around the core 330, driving force capable of rotating the rotor 200 may be generated by electromagnetic interaction between the magnet 220 and the core 330 having the coil 320 wound therearound.

Therefore, the rotor 200 may rotate, such that the shaft 110 fixedly coupled to the rotor 200 may rotate together with the rotor 200.

The rotor 200 may allow the lubricating fluid to be sealed between the rotor 200 and an outer peripheral surface of the upper portion of the sleeve 120 and include a main wall part 216 protruding downwardly from one surface of the rotor 200 in the axial direction so as to seal the lubricating fluid.

That is, the main wall part 216 may protrude from one surface of the rotor 200, the rotating member, to allow the lubricating fluid to be sealed between the rotor 200 and the sleeve 120, the fixed member.

More specifically, the main wall part 216 may be extended along the outer peripheral surface of the sleeve 120, the fixed member, so that an interface of the lubricating fluid is formed between an inner peripheral surface of the main wall part 216 and the outer peripheral surface of the upper portion of the sleeve 120, the fixed member.

In addition, a bottom surface of the main wall part 216 may be formed to face the base member 310 to which the sleeve 120 is fixed.

Meanwhile, one of a surface of the rotor 200 facing the sleeve and a surface of the sleeve 120 facing the rotor may be provided with the thrust dynamic pressure groove 124, and the other surface of the facing surfaces may be provided with an extension groove 218.

The extension groove 218 may be extended outwardly of the thrust dynamic pressure groove 124 so as to partially face the thrust dynamic pressure groove 124.

More specifically, the extension groove 218 may be formed as a groove extended upwardly in the axial direction from one surface of the rotor 200 facing the upper surface of the sleeve 120.

Since the extension groove 218 partially faces the thrust dynamic pressure groove 124, the size of the clearance between the rotor 200 and the sleeve 120 is changed.

That is, the clearance between the rotor 200 and the sleeve 120 may be formed to have the largest width in a location in which the extension groove 218 and the thrust dynamic pressure groove 124 face each other.

Figure 2:
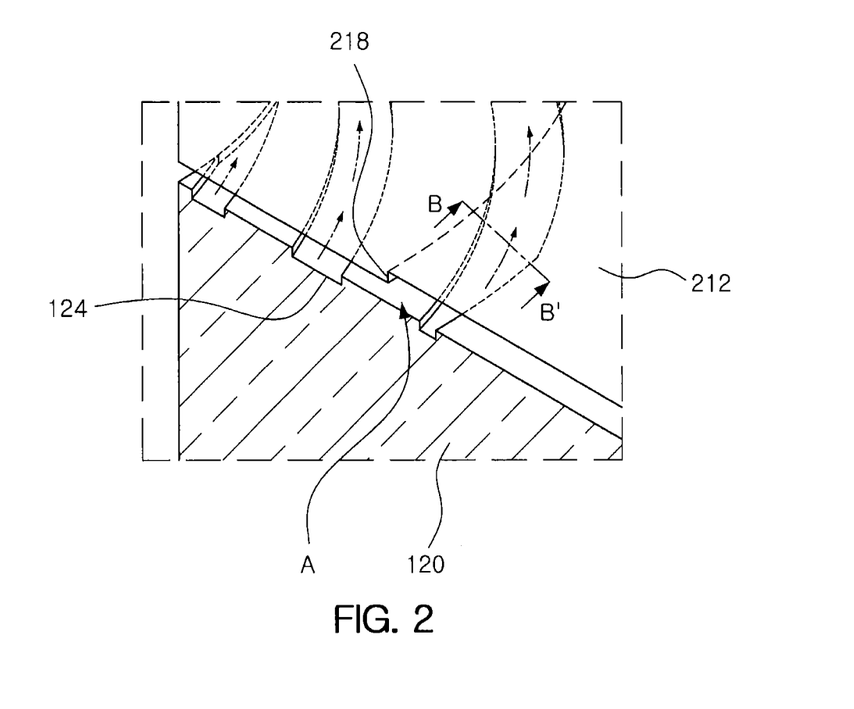
FIG. 2 is a perspective view showing a rotor including an extension groove and a sleeve including a thrust dynamic pressure groove partially facing the extension groove according to the embodiment of the present invention.
Figure 3:
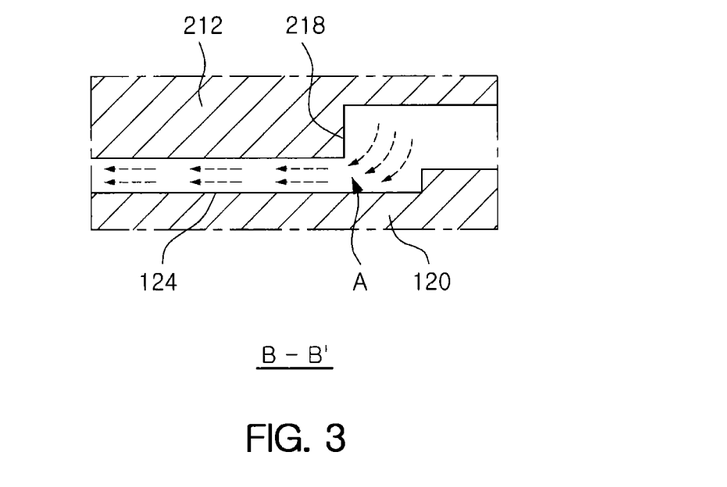
FIG. 3 is a schematic cross-sectional view taken along line B-B' of FIG. 2.
Figure 4:
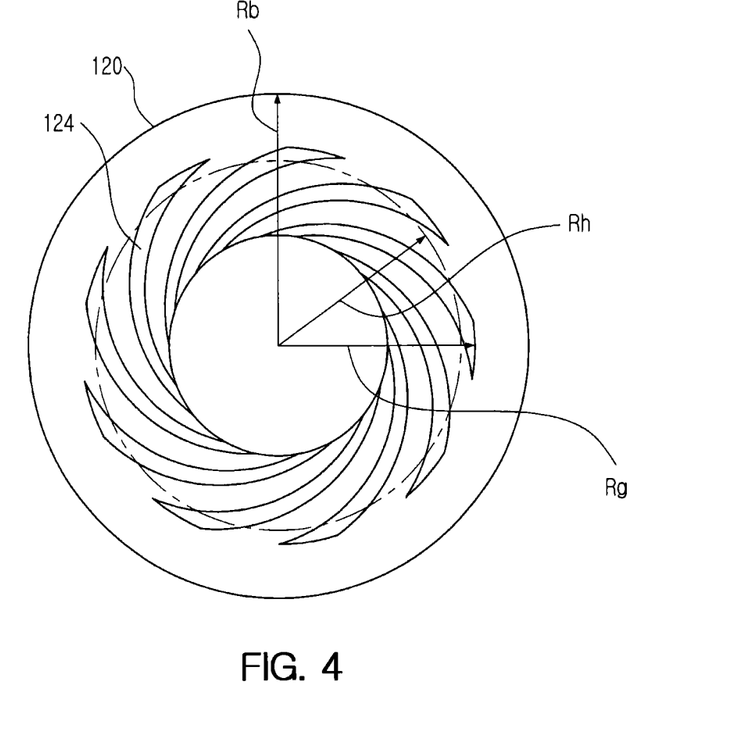
FIG. 4 is a plan view showing an upper surface of the sleeve including the thrust dynamic pressure groove according to the embodiment of the present invention.
Figure 5:
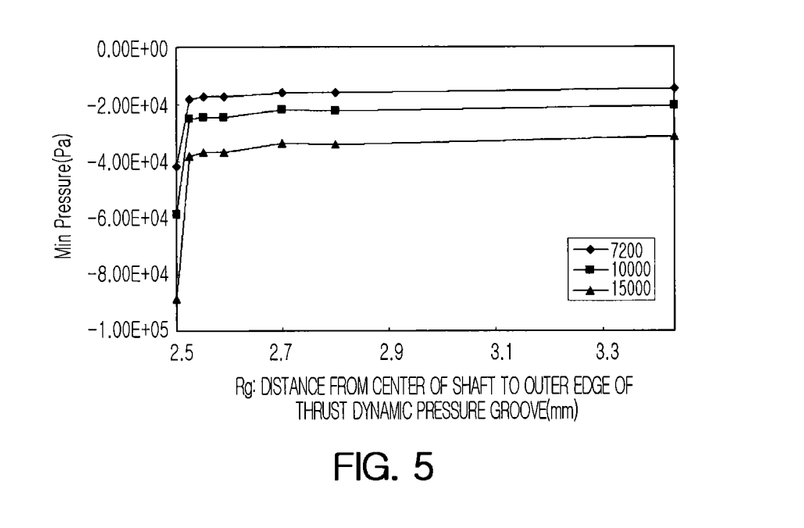
FIG. 5 is a graph showing results obtained by calculating Pmin while changing Rg with respect to rotational speeds of 7200 rpm, 10000 rpm, and 15000 rpm.

FIG. 2 is a perspective view showing a rotor including an extension groove and a sleeve including a thrust dynamic pressure groove partially facing the extension groove according to the embodiment of the present invention; FIG. 3 is a schematic cross-sectional view taken along line B-B' of FIG. 2; FIG. 4 is a plan view showing an upper surface of the sleeve including the thrust dynamic pressure groove according to the embodiment of the present invention; and FIG. 5 is a graph showing results obtained by calculating Pmin while changing Rg with respect to rotational speeds of 7200 rpm, 10000 rpm, and 15000 rpm.

Hereinafter, the thrust dynamic pressure groove 124 and the extension groove 218 according to the embodiment of the present invention will be described with reference to FIGS. 2 through 5.

The thrust dynamic pressure groove 124 may be provided in one of the surface of the rotor 200 facing the sleeve and the surface of the sleeve 120 facing the rotor.

In addition, the extension groove 218 may be provided in the other surface of the surface of the rotor 200 facing the sleeve and the surface of the sleeve 120 facing the rotor. More specifically, the thrust dynamic pressure groove may be provided in the sleeve 120, and the extension groove 218 may be provided in the rotor 200.

Further, the extension groove 218 may be formed in the rotor 200 so as to partially face the thrust dynamic pressure groove 124 and be extended to the outside of the thrust dynamic pressure groove 124.

The thrust dynamic pressure groove 124 may have a herringbone shape, a spiral shape, or a helical shape and be formed in the upper surface of the sleeve 120.

Here, Rh is defined as a distance from the center of the shaft 110 to an inner edge of the extension groove 218, Rg is defined as a distance from the center of the shaft 110 to an outer edge of the thrust dynamic pressure groove 124, and Rb is defined as a distance from the center of the shaft 110 to the outer peripheral surface of the sleeve 120.

Relationships between Rh, Rg, and Rb may be represented by the following conditional Equation 1.

$$Rh < Rg < Rb \qquad \text{[Conditional Equation 1]}$$

Here, the distance Rg from the center of the shaft 110 to the outer edge of the thrust dynamic pressure groove 124 may be longer than the distance Rh from the center of the shaft 110 to the inner edge of the extension groove 218 and be smaller than the distance Rb from the center of the shaft 110 to the outer peripheral surface of the sleeve 120.

Therefore, the extension part 218 may partially face the thrust dynamic pressure groove 124.

When the rotor 200 rotates, a flow of the lubricating fluid may be generated from an outer portion of the clearance between the rotor 200 and the sleeve 120 to an inner portion thereof in the radial direction.

Here, first, describing the case in which the distance Rh is equal to the distance Rg (Rh=Rg), the clearance between the rotor 200 and the sleeve 120 may be divided into three portions.

That is, the clearance may be divided into a clearance between the rotor 200 positioned in an inner portion of the extension groove 218 in the radial direction and the sleeve 120, a clearance between the inner edge of the extension groove 218 and the sleeve 120, and a clearance between the extension groove 218 and an outer portion of the thrust dynamic pressure groove 124.

Here, the clearance between the rotor 200 and the sleeve 120 may be lowest at the clearance between the inner edge of the extension groove 218 and the sleeve 120.

Therefore, since the lubricating fluid passes through the clearance that becomes narrow, low pressure may be generated between the inner edge of the extension groove 218 and the sleeve 120.

When the low pressure is generated, air bubbles may be generated in the lubricating fluid, and non repeatable run out (NRRO) may be rapidly increased due to the areas of low pressure, which may have a negative effect on the performance of the motor.

However, in the case in which the distance Rg is greater than the distance Rh (Rh<Rg) as described in the embodiment of the present invention, since the clearance through which the lubricating fluid flows widens in a location A (a low pressure-generation portion) between the inner edge of the extension groove 218 and the sleeve 120, the generation of low pressure adjacent to portion A may be prevented.

In the case in which the distance Rg is equal to the distance Rb (Rg=Rb), the thrust dynamic pressure groove 124 is provided in the entire upper surface of the sleeve 120.

Therefore, since a change in the clearance is small in portion A (the portion adjacent to which the low pressure is generated) between the inner edge of the extension groove 218 and the sleeve 120, the generation of low pressure at portion A may be similarly prevented.

However, the case in which the thrust dynamic pressure groove 124 is provided in the entire upper surface of the sleeve 120 may not be preferable in view of processing efficiency.

Referring to FIGS. 4 and 5, effects of the motor 400 according to the embodiment of the present invention will be described.

As shown in FIG. 4, the distance Rh is the distance from the center of the shaft 110 to the inner edge of the extension groove 218, the distance Rg is the distance from the center of the shaft 110 to the outer edge of the thrust dynamic pressure groove 124, and the distance Rb is the distance from the center of the shaft 110 to the outer peripheral surface of the sleeve 120.

In the present embodiment, specifically, experiments were performed by variously changing the distance Rg in a state in which the distance Rh=2.5 mm and the distance Rb=3.44 mm.

In addition, minimum pressure in the low pressure generation portion A was defined as minimum pressure Pmin.

Referring to FIG. 5, it may be appreciated that in the case in which the distance Rg is equal to or greater than 2.525 mm, it may be appreciated that the generation of low pressure is significantly reduced.

That is, although the distance Rg is longer than the distance Rh by 0.025 mm, the generation of low pressure may be reduced by about 57%.

In the case in which the distance Rg is equal to the distance Rb (Rg=Rb), the generation of low pressure may be reduced by about 65%. However, in consideration of the efficiency of a process of providing the thrust dynamic pressure groove 124 in the entire upper surface of sleeve 120, it may be preferable that the distance Rg is shorter than the distance Rb.

The thrust dynamic pressure groove 124 and the extension groove 218 according to the embodiment of the present invention will be described with reference to FIGS. 6 through 9.

Figure 6:
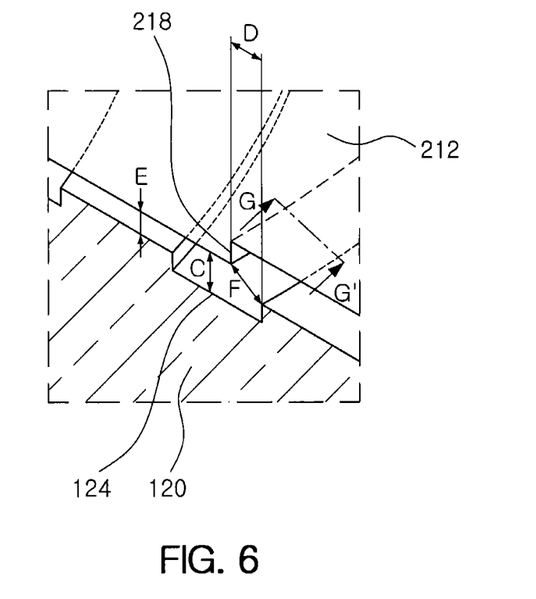
FIG. 6 is a perspective view showing a rotor including an extension groove and a sleeve including a thrust dynamic pressure groove partially facing the extension groove according to the embodiment of the present invention.
Figure 7:
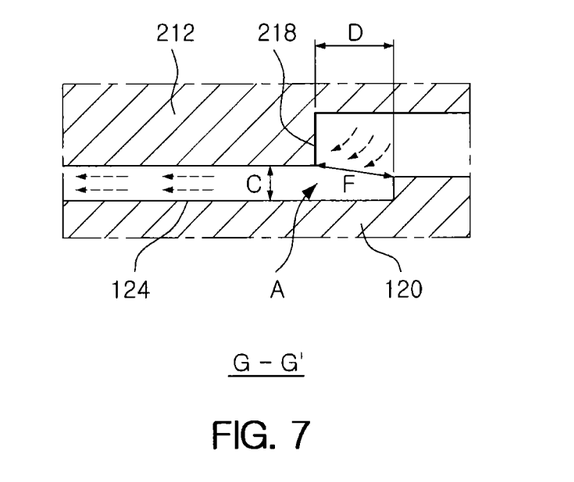
FIG. 7 is a schematic cross-sectional view taken along line G-G' of FIG. 6.

C, D, E, and F will be defined as follows with reference to FIGS. 6 and 7.

E indicates a distance of the clearance between the rotor 200 positioned at the inner portion of the extension groove 218 in the radial direction and the sleeve 120.

C indicates a sum of the distance E of the clearance between the rotor 200 positioned at the inner portion of the extension groove 218 in the radial direction and the sleeve 120 and a depth of the thrust dynamic pressure groove 124.

D indicates a length of a portion of the extension groove 218 facing the thrust dynamic pressure groove 124.

F indicates the shortest distance among distances between the inner edge of the extension groove 218 and the outer edge of the thrust dynamic pressure groove 124.

Here, F may satisfy the following Conditional Equation 2.

$$F=(D^2+E^2)^{0.5}$$ [Conditional Equation 2]

Similarly as described above, in the case in which the extension groove 218 partially faces the thrust dynamic pressure groove 124 so that D and F are predetermined values, since a path through which the lubricating fluid flows widens in portion A (low pressure generation portion) between the inner edge of the extension groove 218 and the sleeve 120, the generation of low pressure in portion A may be prevented.

Figure 8:
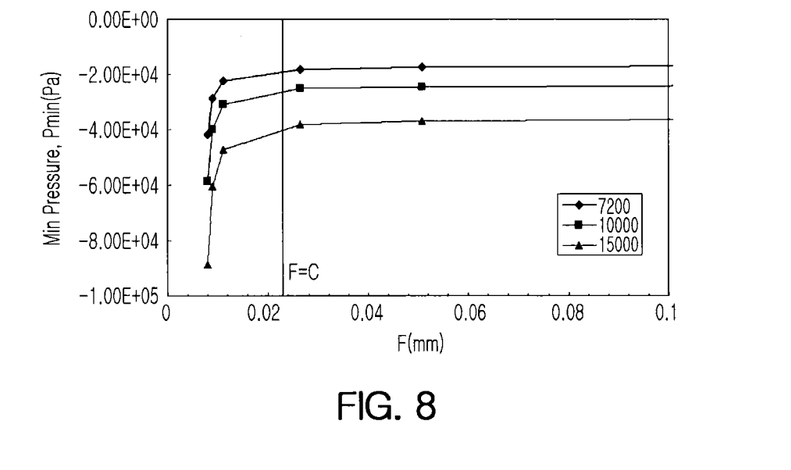
FIG. 8 is a graph showing results obtained by calculating Pmin while changing a length of F with respect to rotational speeds of 7200 rpm, 10000 rpm, and 15000 rpm.

Here, referring to FIG. 8, it may be appreciated that in the case in which F is greater than 0.012 mm, the generation of low pressure may be significantly reduced.

Conditions for the distance F according to the embodiment of the present invention will be described in detail with reference to FIG. 9.

Figure 9:
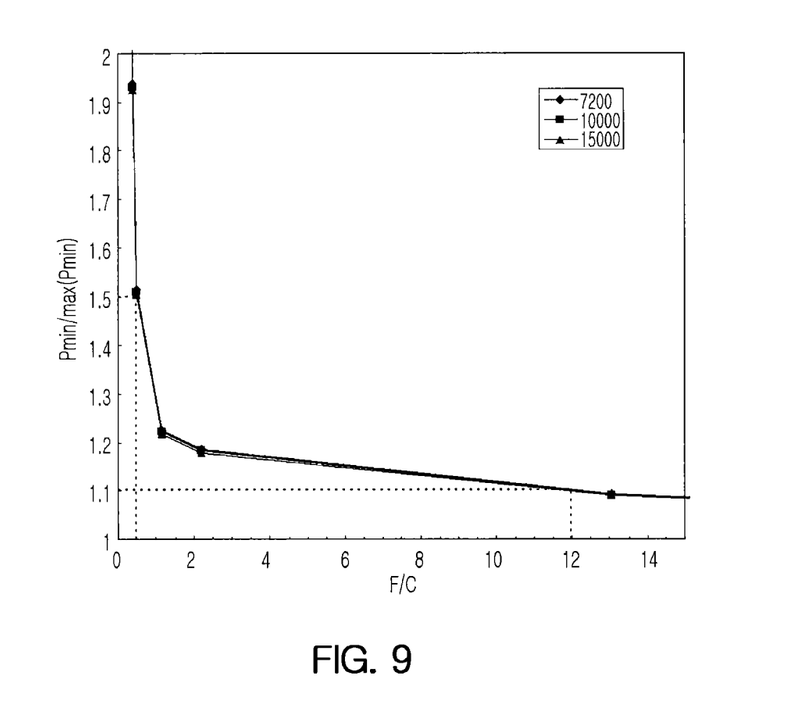
FIG. 9 is a graph showing results obtained by measuring a ratio of Pmin to max (Pmin) while changing a ratio of F to C.

Results obtained by measuring the ratio of Pmin to max (Pmin) while changing a ratio of F to C are shown in FIG. 9.

Here, Pmin indicates minimum pressure in the low pressure generation portion A according to the change in F, and max (Pmin) indicates minimum pressure in the low pressure generation portion A when D is the maximum.

Here, when F/C is smaller than 0.5, Pmin/max(Pmin) is larger than 1.5.

With reference to FIG. 9, it may be appreciated that when F/C is smaller than 0.5 and Pmin/max(Pmin) is larger than 1.5, an effect of reducing the generation of low pressure is low.

In addition, in the case in which F/C is larger than 12, that is, when Pmin/max (Pmin) is smaller than 1.1, since the thrust dynamic pressure groove 124 needs to be formed so as to be extended in the upper surface of the sleeve 120, this case may not be preferable in view of processing efficiency.

Therefore, the thrust dynamic pressure groove 124 may be formed so as to satisfy the following Conditional equation 3 in the present embodiment.

$$0.5<F/C<12$$ [Conditional Equation 3]

Figure 10:
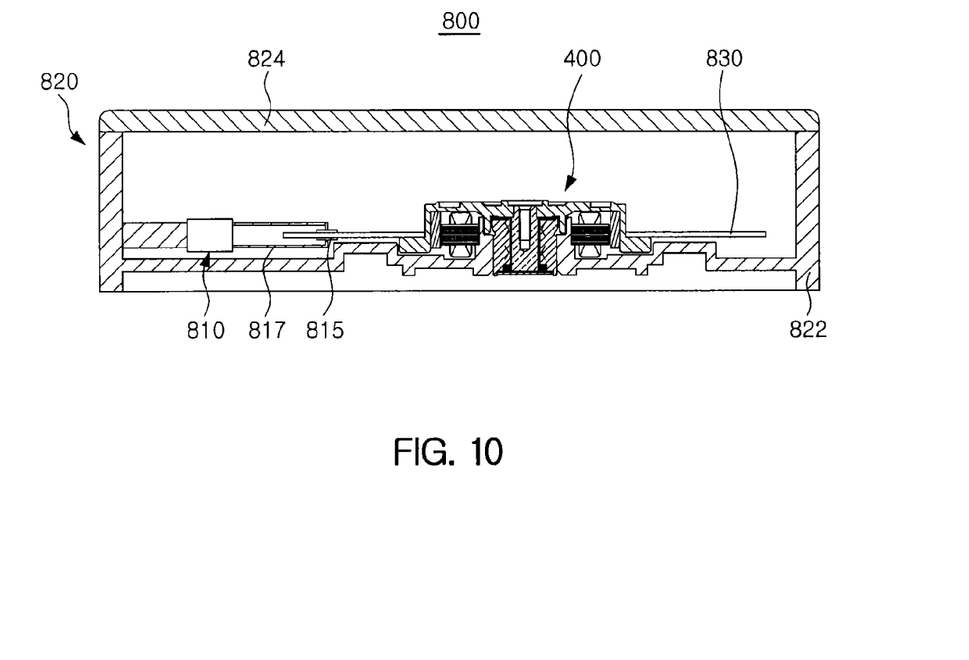
FIG. 10 is a schematic cross-sectional view of a disk driving device using a motor according to an embodiment of the present invention.

FIG. 10 is a schematic cross-sectional view of a disk driving device using a motor according to the embodiment of the present invention.

Referring to FIG. 10, a recording disk driving device 800 having the motor according to the embodiment of the present invention mounted therein is a hard disk driving device and may include the motor 400, a head driving part 810, and a housing 820.

The motor 400 may have all the characteristics of the motor according to the above-described embodiment of the present invention and include a recording disk 830 mounted thereon.

The head driving part 810 may transfer a magnetic head 815 reading information from the recording disk 830 mounted on the motor 400 to a surface thereof from which information is to be read.

Here, the magnetic head 815 may be disposed on a support part 817 of the head driving part 810.

The housing 820 may include a motor mounting plate 822 and a top cover 824 shielding an upper portion of the motor mounting plate 822 in order to form an internal space receiving the motor 400 and the head driving part 810.

The motor and the hard disk drive including the same according to the present invention may prevent low pressure from being generated between the rotor and the sleeve, thereby suppressing the generation of air bubbles in the lubricating fluid.

As set forth above, according to embodiments of the present invention, a motor and a hard disk drive including the same may prevent low pressure from being generated between a rotor and a sleeve, thereby suppressing the generation of air bubbles in a lubricating fluid.

While the present invention has been shown and described in connection with the embodiments, it will be apparent to those skilled in the art that modifications and variations can be made without departing from the spirit and scope of the invention as defined by the appended claims.

What is claimed is:

1. A motor comprising:
   a sleeve supporting a shaft with a lubricating fluid; and
   a rotor fixed to the shaft, rotating together therewith, and having a surface facing the sleeve,
   wherein one surface of the surface of the rotor facing the sleeve and a surface of the sleeve facing the rotor is provided with a thrust dynamic pressure groove, and
   the other surface of the surface of the rotor facing the sleeve and the surface of the sleeve facing the rotor is provided with an extension groove extended to the outside of the thrust dynamic pressure groove so as to partially face the thrust dynamic pressure groove.

2. The motor of claim 1, wherein the thrust dynamic pressure groove is formed in the sleeve and the extension groove is formed in the rotor.

3. The motor of claim 1, wherein the motor satisfies the following Conditional Equation 1:

$$Rh < Rg < Rb \qquad \text{Conditional Equation 1}$$

where, Rh indicates a distance from a center of the shaft to an inner edge of the extension groove, Rg indicates a distance from the center of the shaft to an outer edge of the thrust dynamic pressure groove, and Rb indicates a distance from the center of the shaft to an outer peripheral surface of the sleeve.

4. The motor of claim 1, wherein the motor satisfies the following Conditional Equation 2:

$$F = (D^2 + E^2)^{0.5} \qquad \text{Conditional Equation 2}$$

where, D indicates a length of a portion of the extension groove facing the thrust dynamic pressure groove, E indicates a distance of a clearance between the rotor at an inner portion of the extension groove in a radial direction and the sleeve, and F indicates the shortest distance among distances between an inner edge of the extension groove and an outer edge of the thrust dynamic pressure groove.

5. The motor of claim 1, wherein the motor satisfies the following Conditional Equation 3:

$$0.5 < F/C < 12 \qquad \text{Conditional Equation 3}$$

where, F indicates the shortest distance among distances between an inner edge of the extension groove and an outer edge of the thrust dynamic pressure groove, and C indicates a sum of a distance of a clearance between the rotor at an inner portion of the extension groove in a radial direction and the sleeve and a depth of the thrust dynamic pressure groove.

6. The motor of claim 1, wherein a clearance between the rotor and the sleeve is widest in a location in which the extension groove and the thrust dynamic pressure groove face each other.

7. The motor of claim 1, wherein the thrust dynamic pressure groove is formed in a portion of an upper surface of the sleeve.

8. The motor of claim 1, wherein the thrust dynamic pressure groove has any one of a spiral shape, a herringbone shape, and a helical shape.

9. The motor of claim 1, further comprising a stator coupled to the sleeve and including a core having a coil wound therearound in order to generate rotational driving force.

10. A hard disk drive comprising:
   a motor of claim 1 rotating a disk by power applied through a substrate;
   a magnetic head writing data to the disk and reading data from the disk; and
   a head driving part transferring the magnetic head to a predetermined position on the disk.

* * * * *

UNITED STATES PATENT AND TRADEMARK OFFICE
CERTIFICATE OF CORRECTION

PATENT NO.        : 8,737,016 B1                                           Page 1 of 1
APPLICATION NO.   : 13/742836
DATED             : May 27, 2014
INVENTOR(S)       : Kim et al.

It is certified that error appears in the above-identified patent and that said Letters Patent is hereby corrected as shown below:

On the Title Page, after Item [22] (Filed), insert Item -- [30] (Foreign Application Priority Data), Korean Patent Application No. 10-2012-0092357, filed August 23, 2012 --.

Signed and Sealed this
Twenty-eighth Day of October, 2014

Michelle K. Lee
*Deputy Director of the United States Patent and Trademark Office*